United States Patent Office 2,788,186
Patented Apr. 9, 1957

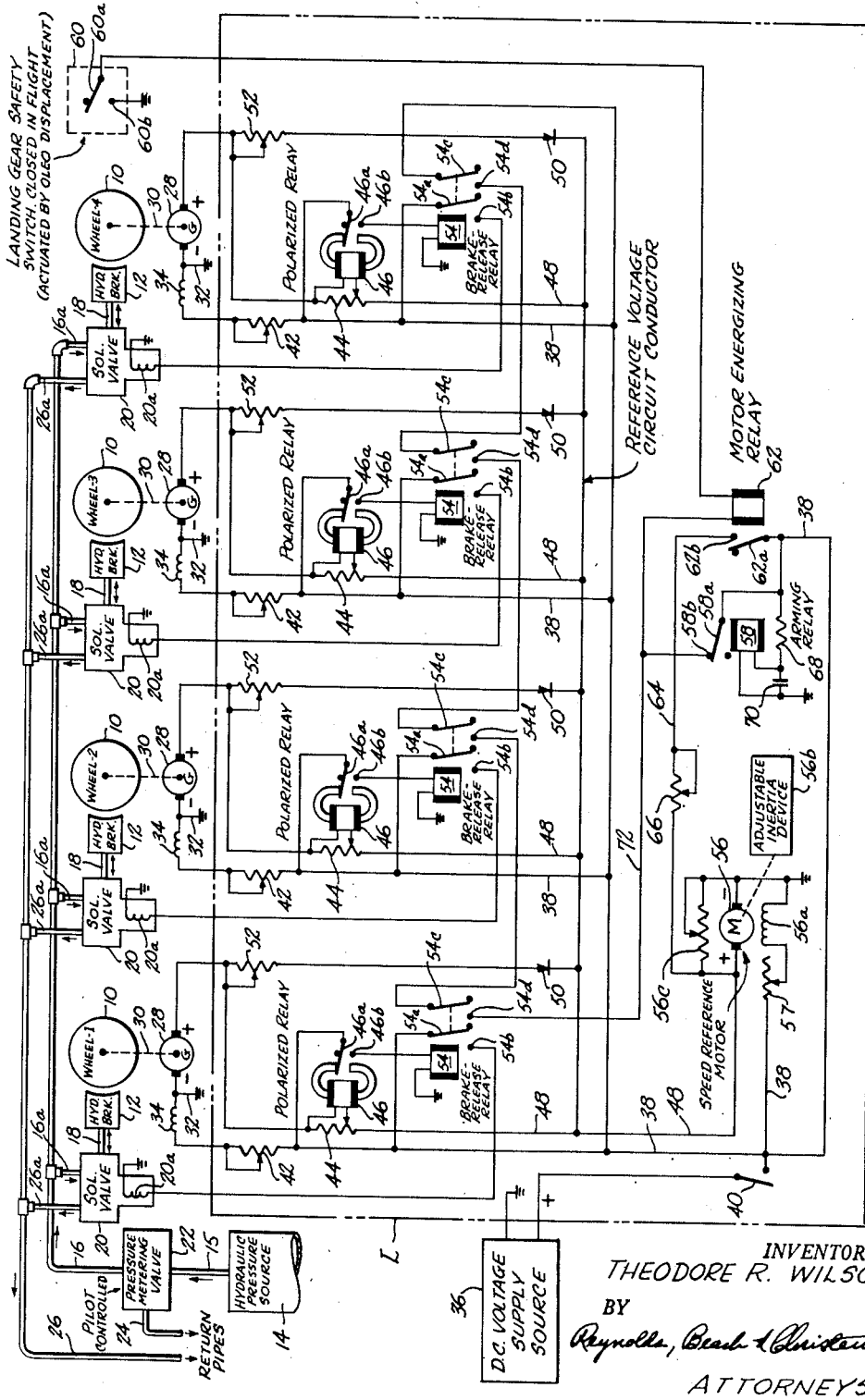

2,788,186

ANTI-SKID BRAKE CONTROL SYSTEM

Theodore R. Wilson, Seattle, Wash., assignor to Boeing Airplane Company, Seattle, Wash., a corporation of Delaware Application May 28, 1954, Serial No. 433,138

16 Claims. (Cl. 244—111)

This invention relates to apparatus for automatically regulating application of brakes to vehicle wheels in such manner that the vehicle may be decelerated as rapidly as possible and without appreciable slipping or skidding of the wheels. The invention is herein illustratively described by reference to its application in an airplane hydraulic brake system wherein four wheels or four sets of wheels are provided with separate brakes all arranged to be actuated by operation of a master pressure metering valve under control of the airplane pilot, but with each such brake being separately releasable by the automatic apparatus herein disclosed as necessary to prevent skidding of any such wheel or set of wheels. However, it will be readily apparent to those skilled in the art that the invention is not confined in its usefulness to a particular application nor is it limited in form by the details comprising the basis for this disclosure which represent the presently preferred form thereof.

In general, there have been a number of proposals made in the past for accomplishing the results set forth above particularly in the case of brake systems for large airplanes and for railroad cars. It is extremely difficult, if not impossible, for the pilot of a large airplane to detect an incipient skid condition of one or more wheels and prevent its materializing by reducing the brake pressure the instant the wheel or wheels begins to slip (i. e., decelerate from full rolling speed). Wheel slipping and skidding caused by application of excessive brake force is highly undesirable during the landing run of an airplane for a number of reasons including excessive and uneven wear on tires, danger of blow-outs, possible loss of control over the airplane, and reduced braking efficiency due to the fact that a slipping or skidding wheel provides less traction for braking purposes than a wheel which is permitted to roll at substantially full running speed. To be most effective, therefore, an automatic brake control system of the type herein disclosed should detect an incipient skid or slipping condition of any separately braked wheel or set of wheels and immediately reduce or interrupt brake pressure on that wheel sufficiently to permit its return substantially to full rolling speed, whereupon full brake pressure is restored.

In practice the airplane pilot attempting to bring his craft to a stop in the shortest possible landing run with a brake system of the automatically regulated type disclosed herein will adjust the setting of the pressure metering valve to a value above that necessary to achieve maximum deceleration of the airplane under prevailing landing conditions. As a result, brake pressure actually applied to the wheels will be caused to pulsate intermittently between a skid-producing value metered by the pilot and a skid-terminating value determined by the nature of the brake-pressure-relieving means employed. An average or effective value of brake pressure results which is only slightly lower than the optimum value for achieving maximum rate of deceleration of the airplane and is much closer to such optimum value than can ordinarily be achieved by manual control alone. With experience a pilot can quickly adjust or vary the adjustment of the pressure metering valve so as to reduce the recurrence rate of brake pressure pulsations thus produced in the brake system to low value and thereby subject the wheels to a steadier brake pressure the average value of which more nearly approaches said optimum value for achieving maximum deceleration under the prevailing conditions.

The present invention provides an automatic skid-preventing brake control system achieving the above general purposes in a more satisfactory manner in at least certain important respects than previous systems of the same general type. In particular, the present invention provides a relatively simple and low cost system capable of reliable operation under the various operating conditions likely to be encountered.

Another object is such a system having inherent safety features, such that if any of various electrical connections in the system are severed or damaged the pilot will still have manual control over the brakes.

Another object is a system of the type described eliminating the need for special skid-detecting mechanisms, including rotative momentum devices associated with each wheel or each set of wheels requiring separate control. The present system accomplishes this result by providing a novel arrangement wherein the automatic process of detecting incipient skid of any of the various wheels is consolidated in relatively simple electrical apparatus having a single device providing the skid-detecting speed reference for all the wheels. Moreover, the major portion of such apparatus may be conveniently mounted within the airplane fuselage or other suitable location remote from the wheels themselves. As a result of these provisions the initial cost of the apparatus, and the maintenance thereof, are at a minimum, and mechanical difficulties experienced with prior devices due to the jarring effects of wheel shocks and vibrations, and due to infiltration of moisture and dirt where delicate or sensitive momentum devices and associated switching mechanisms are mounted on the landing gear are avoided in the present system.

Another object is such a system having features causing inherent restoration of full control over braking to the pilot-controlled pressure metering valve when the airplane has slowed down to taxiing speed and substantially the full weight of the airplane rests on the landing wheels so that the likelihood of producing dangerous skidding is nil.

Another object of the invention is an improved brake control system of the type described which may be provided with conveniently available adjustments for meeting different operating conditions, such as predicted landing speed, runway traction conditions, and possible others affecting the optimum settings of apparatus components.

The above and other objectives are achieved by the improved system in which each wheel or set of wheels to be subjected to separately controlled braking drives a separate voltage generating means comprising, in the illustrated embodiment, a separately excited D. C. generator. The output voltage of each generator is applied through an associated unidirectionally conductive device to a reference voltage circuit common to such generators. The individual, wheel-driven generators are so designed or adjusted that when the wheels all rotate at substantially equal peripheral speeds, as when no wheels are slipping during braking conditions or as when all wheels are slipping to the same degree under such conditions, their respective generator output voltages will be substantially equal. A separate brake release control means is provided for each wheel brake, each such means having a polarity-sensitive actuating element connected for energization by voltage differences developing between the associated wheel-driven generator and the voltage reference circuit. Thus if one wheel commences to slip its associated brake release control means will immediately be actuated to remove or reduce brake pressure and permit such wheel to accelerate back to substantially full running speed before restoration of braking thereof can take place.

With the arrangement described in the preceding paragraph, if all of the wheels slip at once, the voltage differential necessary for energizing the individual brake release control means to prevent skidding of the wheels will fail to materialize since the voltage of the reference voltage circuit will not then sufficiently exceed the output voltage of any wheel-driven generator. In view of this difficulty, a highly important feature of the improved system resides in the provision of electrodynamic energy storage means preferably in the form of a D. C. motor having its armature terminals connected across the common reference voltage circuit so as to cause such motor to be driven by flow of current from said wheel-driven generators. The motor, serving as a wheel speed reference, is so designed or adjusted that, when deenergized, its normal deceleration rate, as during airplane landing conditions, only slightly exceeds the maximum wheel deceleration rate obtainable by applied braking, so that the motor is continuously receiving energy from the wheel-driven generators while such wheels are rotating at ground speed. Thus the motor converts electrical energy into mechanical energy and stores the latter in a quantity which at any instant is approximately proportional to the instantaneous peripheral ground speed of a non-slipping wheel. The counterelectromotive force (back E. M. F.) developed in the armature of this motor plus the current-resistance (IR) voltage drop occurring therein is equal to the applied voltage from said wheel driven generators. Thus if all the whels of the airplane start to slip from application of excessive brake force during the landing run, the back E. M. F. of the motor will exceed the output voltage of the corresponding wheel-driven generators. When this voltage difference becomes appreciable, energizing current flows in the energizing circuits of the brake release control means associated with the slipping wheels, and the brakes thereof are individually released until such wheels can accelerate to substantially full running speed. Materialization of such a voltage difference is possible despite the continued connection of the wheel-driven generators to the motor through the reference voltage circuit, as the unidirectionally conductive devices mentioned above have an isolating effect.

In addition to various provisions for adjustment of operating components of the improved brake control system to provide optimum control over braking under different operating or landing conditions, the invention includes still other features of importance. It is desirable, for instance, during the initial touch-down of the landing wheels on the runway that the wheel brakes be in the released condition so that the wheels can accelerate freely to full running speed with a minimum of skidding and thereby spare the tires from excessive wear and eliminate the possibility of dangerous loss of control over the airplane. Also, it is desirable at that time that the speed-reference motor be rotating at a speed not greatly less than that which corresponds to the airplane landing speed so that if the landing wheels commence to slip due to excessive braking force immediately after initially reaching full running speed, the control system will respond and relieve the skidding condition. Accordingly, the system includes circuit means arranged for applying energizing voltage to the brake release means and simultaneously to the speed-reference motor preparatory to landing of the airplane. In practice the energizing voltage is applied to the reference voltage circuit mentioned above and is established at a value equal to or slightly less than the output voltage which will be generated by the wheel-driven generators when the landing wheels first come up to full running speed during the landing; hence as the wheel-driven generators attain full voltage, the brake release means associated therewith will be deenergized and the brakes automatically applied, assuming the pilot has adjusted the metering valve to establish braking pressure in the hydraulic brake lines.

The initially applied, or pre-landing condition, energizing voltage is automatically removed from the skid-preventing circuits when any one of said wheels comes up to full running speed initially during a landing, thereby leaving such circuits connected to the wheel-driven generators alone. This result is accomplished by interruption of a holding circuit for a motor-enegizing relay, said holding circuit being formed through series-connected contacts of brake release relays incorporated in the respective brake release control means.

A landing gear safety switch closed in flight automatically opens when a substantial portion of the weight of the airplane is assumed by the landing gear oleos so as to eliminate the possibility of untimely release of brakes during taxiing movement and parking of the airplane on the landing field.

It will be recognized that an electrical voltage constitutes an electrical stimulus or pressure and that other forms of pressure may be utilized basically in practicing the invention. Thus broadly speaking the wheel-driven generators may be regarded as pressure generators, and the energy-storing speed-reference motor counterelectromotive force may also be regarded as a pressure which increases and decreases with energy stored by such motor.

These and other features, objects and advantages of the invention, including certain details of the preferred embodiment as herein disclosed will become more fully evident from the following description by reference to the accompanying drawing.

The drawing constitutes a schematic diagram of the presently preferred embodiment of the improved brake control system of this invention.

In the drawing the airplane landing wheel units 10 may comprise individual wheels or sets of wheels. In the latter event the wheels of each set will be connected together for conjoint rotation so that if one wheel should start slipping due to application of excessive braking force, the other wheel or wheels in the same set will do likewise. In the illustration the four consecutively numbered wheels could represent, for example, front and rear pairs of wheel units in a quadricycle landing gear arrangement. Each wheel unit 10 is provided with individual hydraulic brake means 12. Hydraulic brake fluid under pressure is supplied to operate the four brakes simultaneously from the hydraulic pressure source 14 connected to the hydraulic brake means through a pressure conduit 15 leading to a pressure conduit 16 having branches 16a extending respectively to the individual brake conduits 18 through normally open supply passages of the respective solenoid operated valves 20. The actual pressure of hydraulic brake fluid supplied to the individual hydraulic brake means 12 through the conduits 16, 16a and 18 is controlled by the setting of a pressure metering valve 22 interposed between the supply conduits 15 and 16. The pressure metering valve 22 is under control of the airplane pilot, who may increase or decrease the brake pressure applied to the landing wheels by making corresponding adjustments in the position of the metering valve control element (not shown). The pressure metering valve 22 may be of any conventional or other type, and ordinarily functions by reducing the pressure of hydraulic brake fluid delivered to it from the pressure source 14 to any lower value of pressure for application to the conduit 16, such valve including a by-pass (not shown) leading to the fluid return pipe 24.

The solenoid-operated valves 20 as stated above normally furnish a passage directly interconnecting the respective supply conduit branches 16a and the associated individual brake conduits 18 for subjecting the individual hydraulic brake means 12 to the pressure of hydraulic fluid in such branch conduits. However, when the solenoid 20a in any of these solenoid valve units is energized, the valve itself is shifted in position so as to interconnect the associated brake conduit 18 and a branch 26a of return conduit 26, thereby to reduce the brake pressure applied to the associated wheel unit by causing the hydraulic brake fluid pressure to collapse. Thus the solenoid-operated valves 20 associated with the individual hydraulic brake means 12 for the different wheel units 10 serve as electrically controllable devices capable of relieving any landing wheel unit or brake pressure metered by the valve 22, independently of brake pressure applied to the other wheel units. The solenoid-operated valve units 20 may be of any conventional or other suitable type.

The general purpose of the automatic brake control system is to selectively energize the valve solenoids 20a as necessary to prevent the wheels or any wheel from slipping and skidding due to excessive brake pressure applied thereto by reason of the setting of metering valve 22. When any of the wheels 10 commences to slip to a degree detected by the automatic control system the associated valve solenoid 20a is electrically energized to reduce the brake pressure on the wheel for a period of time sufficient to permit the wheel to accelerate substantially to full running speed, whereupon the solenoid is deenergized and metered pressure is restored to the hydraulic brake means 12.

For the purposes of the automatic brake regulating system as herein disclosed, individual voltage generating means are provided in association with each wheel unit for producing wheel-speed voltages which increase and decrease with increase and decrease of rotative speed of such wheels. Preferably the voltage generating means for each wheel unit 10 is in the form of a separately excited direct-current generator, the armature 28 of which is rotatively driven by the associated wheel unit through a mechanical connection 30. One armature terminal of each generator is grounded as at 32. The field winding 34 of each such generator is energized from the positive side of direct-voltage source 36 through conductor 38 when the manually operated master power switch 40 is closed. This switch is closed preliminary to landing of the airplane. A variable resistance 42 connected in series with each generator field winding enables adjustment of field excitation in each generator independently of the remaining generators so that all will produce substantially the same output voltage when the wheels which drive them are all rotating at equal peripheral speeds. Thus the excitation control resistors 42 provide a means to compensate for slight physical-electrical differences between generators and for differences between effective radius of the different wheels due to differences in pneumatic pressure in the tires thereof or differences in tread thickness of such tires.

The positive armature terminal of each generator is connected directly to one end of a corresponding potentiometer winding 44 and to one end of a polarized relay winding 46 associated therewith. The positive armature terminal of each generator is also connected to a reference voltage circuit conductor 48 through a unidirectionally conductive device 50, such as a crystal type rectifier, associated with such generator. When the four landing wheels are rotating at full speed on the ground, the potential appearing on conductor 48 is substantially equal to that existing at the positive armature terminal of each such generator, since the generator voltages provide the potential on conductor 48. Variable resistors 52 connected in series with the respective unidirectional conductive devices 50 constitute a compensating means for equalizing the loading of the generators under conditions wherein the wheels are all rotating at the same peripheral speed on the ground. The end of each potentiometer winding 44 opposite that previously mentioned is connected to reference voltage conductor 48, whereas the slider or wiper of such potentiometer is connected to the other end of the polarized relay winding 46 associated therewith. It will therefore be evident that excitation of the polarized relay winding 46 associated with each of the wheel-driven generators is proportional to the difference between the instantaneous voltage produced by that generator and the voltage existing in the reference voltage circuit including conductor 48, common to all of said generators. As long as the latter voltage is not materially greater than the generated voltage of any wheel driven generator, the associated polarized relay will hold its movable contact 46a in the normal or open position of such relay. However, if one of the wheels commences to slip on the runway due to excessive brake pressure applied thereto so that the voltage produced by the associated generator drops materially below the reference circuit voltage, current will flow in the polarized relay winding 46 in a sense producing reversal in the position of movable contact 46a of such relay.

The rectifiers 50 permit voltages of the wheel-driven generators to be applied to conductor 48 without appreciable voltage drop except that occurring in resistors 52. These rectifiers serve to prevent reverse flow of current in the resistors 52 and thereby permit the wheel-driven generator voltages to drop below the voltage between conductor 48 and ground when the generator speed drops during wheel slipping.

When the position of the movable contact 46a in any such polarized relay is reversed, to engage the associated contact 46b, an energizing circuit is thereby established through the control winding 54 of an associated brake release relay, such energizing circuit extending from the positive supply voltage conductor 38 through the polarized relay contacts and relay winding 54, to ground. One effect of thus energizing the brake release relay 54 associated with any wheel unit 10 is to establish an energizing circuit for the valve solenoid 20a associated with the hydraulic brake means of that wheel unit, such energizing circuit being from the positive supply voltage conductor 38 through the brake release relay contacts 54a, 54b and the solenoid coil, to ground. The polarized relays may be of the type manufactured by the Barber-Colman Company under the name "Micropositioner"; however, other devices of an equivalent nature may be used to provide brake release action in response to voltage differences of the nature mentioned above.

With that portion of the over-all system as thus far described it will be seen that the control winding 46 of each of the four polarized relays associated with the respective wheel units serves as a means for continuously comparing the instantaneous voltage being generated in the associated wheel-driven generator armature 28 with the voltage applied by all of the generators to the reference voltage circuit conductor 48. The latter voltage, that existing between conductor 48 and ground, represents the effective average produced by all the generators, neglecting voltage drop occurring in resistors 52 and rectifiers 50. Hence if one wheel, or even two wheels, commence to slip below full running speed, whereas the remaining wheels continue to rotate at substantially full speed during application of wheel brakes, there will be voltage differences across the control windings 46 of the polarized relays associated with the slipping wheels of such a polarity as to form an energizing circuit for the associated brake release relay windings 54 to energize the corresponding valve solenoids 20a. An immediate reduction in brake pressure applied to the slipping wheels then takes place permitting acceleration of such wheels back toward full running speed, whereupon the voltage difference just mentioned drops to such a low value that the polarized relay automatically reverses itself, opening the energizing circuit for the associated brake release relay and thereby deenergizing the corresponding valve solenoid 20a. Metered brake pressure is thus immediately restored to the wheels upon their acceleration back to full running speed. However, in some instances it is possible for all of the wheels to slip simultaneously due to excessive brake pressure applied thereto. In that event, and in the absence of further provisions such as those hereinafter described, the abovementioned voltage differences necessary to operate the polarized relays fail to materialize, since the potential on conductor 48 drops with the voltages produced by the individual wheel driven generators 28.

In order to provide the desired control over braking even in the situation last mentioned above, the improved system incorporates a dynamo-electric device such as the separately excited direct-current (shunt type) motor shown, wherein the positive terminal of the armature 56 is connected to reference voltage conductor 48 and the negative terminal grounded. The field winding 56a of this motor is energized from positive supply voltage conductor 38 through a variable resistance 57. When the wheel-driven generators 28 rotate at full speed (i. e. without slip of their associated landing wheels 10), the armature 56 of the speed-reference motor, energized by the resultant voltage developed by such generators, will store kinetic energy in an amount corresponding to the ground speed of the airplane. Under these conditions each of the generators 28 contributes to the energization of the speed reference motor 56. Now should all of the wheels 10 start to slip at the same time, there can be no sudden collapse of voltage in the reference voltage circuit (i. e. between conductor 48 and ground) since the mechanical inertia of the speed reference motor armature 56 causes the motor to produce a counterelectromotive force or back E. M. F. which initially at least is only slightly lower than that applied to its terminals when all of the wheels were still rotating at full speed just before starting to slip. Inasmuch as the back E. M. F. provided by the armature 56 maintains voltage between conductor 48 and ground, the necessary voltage differences to operate the polarized relays materialize and the associated valve solenoids 20a are energized to relieve the brake pressure individually on all the wheels and permit the latter to come up to running speed once again before reapplication of metered brake pressure is permitted.

It is obviously essential to the operation of the speed-reference motor 56 in the capacity just described that the armature thereof have an inherent deceleration rate which exceeds the corresponding deceleration rate of the airplane under maximum braking conditions. It is necessary that the motor armature 56 have sufficient inertia, hence momentum, to provide speed-reference voltage sufficient to hold the polarized relays in the energized state during the period in which the landing wheels accelerate substantially to full running speed after automatic brake release action. Nevertheless, the inertia provided in the armature 56 must not be so great that the potential of conductor 48 will be higher at any time during the landing run than the potential of the positive armature terminal 28 of any wheel which is not slipping—otherwise, the polarized relays would remain energized for a longer time than necessary and in an extreme case could cause dangerously prolonged inoperativeness of the brakes. If desired, an adjustable inertia device 56b may be incorporated in the speed reference motor or connected thereto in order to establish the requisite value of inertia for optimum control over braking. In addition to or in lieu of the adjustable inertia device 56b the motor armature 56 may be shunted by a variable resistance 56c providing adjustable dynamic braking by which the rate of self-deenergization (i. e. loss of kinetic energy due to natural deceleration absent motor energizing voltage) of the motor 56 may be established.

It will be evident from the above that a single dynamo-electric device such as the motor 56 is capable of storing kinetic energy proportional to ground speed of the airplane and providing the necessary speed-reference stimulus or voltage for comparison with the individual wheel driven generator stimuli or voltages in order to detect an incipient skid condition of any wheel being braked. Moreover, it will be seen that the energization of the speed-reference motor 56 solely by electrical connections to the wheel-driven generators permits the speed reference motor and its associated components to be mounted remotely from the wheel units proper. Thus all of the apparatus enclosed by the broken line L in the figure may be housed within the fuselage of an airplane whereas in certain former devices it was necessary to mount complicated mechanical inertia and switching mechanisms directly on the landing gear or other wheel supporting structure. The voltage-producing capabilities of the dynamo-electric device 56 at any time during the landing run of an airplane are such that any sudden drop of voltage of all the wheel-driven generators 28 or, more generally, any sudden drop in the rotational speed of some or all of the wheels 10 sufficient to produce a corresponding sudden reduction of potential on conductor 48 will still not remove reference voltage from conductor 48. On the contrary, the back E. M. F. of the motor armature 56 establishes or maintains a potential on conductor 48 of a diminishing value which corresponds substantially to the instantaneous ground speed of the airplane.

It will also be noted that severance of any electrical conductor extending between the control circuits and any valve solenoid 20a or any electrical components of the wheel-driven generators will not disable the brake means of the particular wheel unit associated with the fault. Any such electrical fault can only result in the solenoid valve for the particular wheel unit automatically assuming its normal position in which the supply conduit branch 16a is connected directly to the brake conduit 18, to permit metered-pressure brake operation under control of the pilot.

As a further feature the illustrated system includes means preventing application of metered brake pressure to the landing wheels until after the wheels have accelerated to substantially full running speed upon first contacting the ground during an airplane landing. Preferably this is accomplished by applying voltage from voltage supply conductor 38 to the reference voltage circuit conductor 48 with initial closure of master switch 40 preparatory to landing the airplane. When the switch 40 is first closed, a circuit is formed through the normally closed contacts 58a, 58b of arming relay 58 and the contacts 60a, 60b of landing gear safety switch 60, closed in flight, to energize the winding of motor energizing relay 62 from the direct voltage supply 36. The movable contact 62a of relay 62 then immediately engages contact 62b thereof in order to form a connection, through conductor 64 between energized conductor 38 and the reference voltage conductor 48. A variable resistance 66 is interposed in conductor 64 in order to adjust the voltage actually applied to the reference voltage conductor 48, hence to the terminals of speed-reference motor 56 to a value such that the reference motor 56 will be caused to rotate at a speed slightly less than that which it will experience by energization from the wheel-driven generators 28 when the wheels come up to full running speed during the initial phase of the landing run. If the variable resistance 66 is to be adjusted on a permanent basis, that is, for landing the airplane under all expected conditions, it will be adjusted so that under the applied voltage from source 36 the motor 56 will be caused to rotate at a speed less than that which could result from the slowest possible landing run which could occur at minimum airplane loaded weight and with maximum headwind, so that such motor speed will never exceed that which the motor experiences when energized by generators 28 during the initial phase of any landing run.

The effect of applying voltage to conductor 48 and to the speed reference motor 56 just prior to landing of the airplane is to energize all of the polarized relays 46, since at that time the voltage produced by the generators 28 is zero or very small, even if the wheel tires are provided with flaps to set them spinning before actual ground contact occurs. With the polarized relays thus energized, the solenoid valve windings 20a are energized and the brakes are necessarily off even though the pilot has metered a substantial pressure in the brake fluid conduit 16 by adjustment of the metering valve 22. Thus the landing wheels will be completely free to rotate at the instant of contact thereof with the ground.

Shortly after initial application of voltage from supply source 36 to conductor 48 as effected by energization of motor relay 62, the winding of arming relay 58 will become energized sufficiently to open its contacts 58a, 58b. Although the arming relay winding is connected to the voltage supply source 36 upon closure of master switch 40, there is a time delay required for energization of this relay to materialize fully due to the presence of series resistance 68 and shunt capacitance 70 in the energization circuit thereof. This time delay is made sufficiently long to permit the polarized relays to become actuated and in turn to actuate the brake release relays 54 before the arming relay operates. When the brake release relays are thus actuated, their movable contacts 54c engage stationary contacts 54d to form a holding circuit for the winding of motor relay 62. This holding circuit extends from ground through the landing gear safety switch 60, the winding of relay 62, conductor 72 and the series-connected sets of contacts 54c, 54d of all four brake release relays 54, to the conductor 38. Thus when the arming relay becomes energized to open the contacts 58a, 58b, there will be no loss of reference voltage on conductor 48, since the motor relay contacts 62a, 62b will remain closed.

When any one or more of the landing wheels first attains a rotative speed approaching full running speed on the ground the voltage produced by its generator 28 will approach equality with or exceed the existing voltage between conductor 48 and ground. The polarized relay 46 associated with that wheel will thereby return its movable contact 46a to the normal position, opening the energization circuit for the associated brake release relay 54, causing deenergization of the valve solenoid 20a and permitting initial application of the brakes of the particular wheel. At the same time the holding circuit through the brake release relay contacts 54c, 54d is opened, and the resulting deenergization of the motor relay 62 opens the circuit by which voltage on conductor 38 is applied to reference voltage conductor 48 and motor 56. Thus the system is conditioned for the second or principal phase of automatic control operation wherein an interchange of energy takes place between the wheel driven generators 28 and the speed reference motor 56, as previously described.

The primary purpose of the landing gear safety switch 60 will now be explained. The movable contact 60a of this switch is preferably mounted on one part of a landing gear oleo, whereas the stationary contact 60b of such switch is mounted on a stationary part of the oleo, or vice versa, the arrangement being such that these normally closed contacts are opened automatically with oleo displacement as a substantial part of airplane weight is transferred from the wings to the landing gear of the airplane. When a sufficient transferral of weight to the landing gear has taken place during the landing run the oleo switch contacts 60a, 60b open and there is no further possibility of reenergization of motor relay 62 for applying voltage from conductor 38 to conductor 48 in the control circuit. Hence, there is no possibility of untimely release of the brakes by overvoltage applied to the polarized relays from source 36.

At low ground speeds, as during taxing and parking conditions, the voltage produced by the generators 28, hence the voltage differentials that can be developed between conductor 48 and the positive terminals of the generator armatures, will be insufficient to produce actuation of any polarized relay 46. Thus the skid-preventing system automatically takes itself out of operation and produces no interference with pilot-controlled braking under the above conditions.

OPERATION

Preparation for landing

In brief, the sequence of operations followed when the system is prepared for landing of the airplane commence with the closure of master power switch 40. This switch may be closed manually apart from any other landing preparations such as extension of the landing gear, lowering of the wing flaps, etc., or it may be closed by a mechanical or electrical connection to other apparatus such as the landing gear extension controls or wing flap extension controls, likewise operated whenever the airplane is prepared for landing.

With closure of switch 40 voltage is applied to the coil of motor relay 62 through the normally closed contacts of arming relay 68 and those of landing gear safety switch 60. Voltage from source 36 is thus applied through conductor 38 to the reference voltage circuit conductor 48 through the contacts of motor relay 62. Since the wheel-driven generators 28 are then producing little or no voltage, the appearance of a substantial voltage on conductor 48 produces energization of all the polarized relays 46 which in turn form energizing circuits for the brake release relays 54 associated therewith. The latter in turn form energizing circuits for the valve solenoids 20a and thereby cause the hydraulic brake means 12 associated with each wheel unit 10 to be disconnected from the hydraulic fluid pressure supply conduit 16, so that even if braking pressure is metered by the pilot to the conduit 16 through valve 22, the brakes cannot be applied. Expiration of the delay period for energization of arming relay 58, produced by resistance 68 and condenser 70, producing energization of such relay, has no effect on the above condition since a holding circuit for motor relay 62 is formed through the series-connected contacts 54c, 54d of all the brake release relays 54.

The voltage thus applied to conductor 48 not only energizes the polarized relays to prevent application of brakes to the wheels upon initial ground contact thereof, but brings the speed reference motor 56 up to a rotative speed corresponding to a value which is preferably somewhat less than the minimum speed at which such motor can be driven by energization from the wheel driven generators 28 for the lowest landing velocity expected.

Landing run

When contact of the landing wheels with the runway takes place, some or all the wheels immediately begin to accelerate. The direct voltage produced by the associated wheel driven generators 28 likewise progressively increases and soon eliminates the voltage difference which is causing energization of the associated polarized relay 46, whereupon the latter reverses itself and deenergizes the corresponding brake release relay 54. When this occurs the holding circuit for the motor-energizing relay 62 is broken by opening of one set of contacts 54c, 54d, and the system is placed in automatic operation wherein the only voltage which may exist on reference voltage conductor 48 is that produced by the generators 28 or by the counterelectromotive force produced in the armature of speed reference motor 56, depending upon the instantaneous operating condition of the apparatus.

As a substantial part of the weight of the airplane is transferred substantially from the wings to the landing gear structure, the landing gear safety switch 60 will be actuated to open the contact 60a, 60b, so that the motor relay 62 cannot be reenergized during the remainder of the landing run and thereby accidentally over-speed the speed reference motor 56 to energize all of the polarized relays and cut off pressure to the hydraulic brake means.

When the wheels are rotating at full speed on the ground (i. e. without slipping), the voltage appearing between conductor 48 and ground corresponds to the ground velocity of the airplane and energizes the speed reference motor 56 to rotate at a speed which corresponds substantially to such ground speed. Now should any wheel unit 10 start to slip because of excessive brake pressure applied to the wheels by the pilot-controlled setting of pressure metering valve 22, a voltage difference will develop between the conductor 48 and the positive terminal of the generator 28 of that wheel sufficient to energize the associated polarized relay and interrupt braking of such wheel. The wheel immediately accelerates back toward running speed, and when its speed is substantially equal to full running speed the described voltage difference disappears and the polarized relay automatically reverses itself, restoring brake pressure in the associated brake line.

When one or more wheels commence to slip and a sufficient drop of voltage of the associated wheel-driven generators 28 takes place so as to produce energization of the corresponding polarized relays 46, the necessary energization current for these polarized relays may come from either of two sources, namely the wheel-driven generators 28 of the remaining or nonslipping wheels or the armature windings of speed-reference motor 56, which acts as a voltage generator under certain conditions. If the generators 28 associated with the nonslipping wheels apply a voltage to conductor 48 which is above the existing counterelectromotive force in the armature of motor 56, then these generators will serve as the source of energizing current for the polarized relays of the wheels which have commenced to slip. However, if such generators are incapable of maintaining the potential of conductor 48 above the back E. M. F. of motor 56, as when all of the wheels slip simultaneously, then the polarized relays are energized as a result of the back E. M. F. developed in the armature windings of motor 56. The kinetic energy stored in the motor 56 corresponds at all times substantially to the ground speed of the airplane, so that the back E. M. F. produced by this motor to energize the reference voltage circuit will represent a speed-reference voltage to which the individual wheel-driven generator voltages are compared at all times in order to detect a slipping condition of the respective wheels during brake applications.

If the pilot has set the pressure metering valve 22 at a value producing no skidding of the wheels, then the polarized relays will not operate during the landing run and the brakes will remain applied at all times. However, the pilot is not then assured that the airplane is being decelerated at the maximum possible rate, which may be highly important on a short runway. The pilot has no feasible way of sensing whether or not the brakes are being applied to the point of incipient skidding which is the condition for maximum braking effort. However, if the metering valve has been set by the pilot to a value producing intermittent application and release of the wheel brakes by operation of the automatic control apparatus, then the pilot knows by sensing the intermittent decelerations of the airplane or by noticing the operation of indicator lights (not shown), suitably controlled by relays in the automatic circuits illustrated, that brake pressure exceeds the value producing skidding of the wheels at any particular time. In practice the pilot under these conditions will reduce the setting of the pressure metering valve 22 to minimize the pulsation rate and thereby more nearly approach the ideal condition of maximum effective brake pressure applied to the wheels short of that producing wheel slip. The wheels are at no time permitted to enter an actual skid, since the brake pressure is automatically reduced by energization of the associated valve solenoid during the incipient stages of a developing skid, namely when the wheel is starting to slip slightly on the ground.

As the airplane slows down, the voltage produced by the wheel-driven generators 28 suffers a proportionate decline. The reference motor 56 will also decelerate due to the effects of friction and dynamic braking produced by the shunt resistance 56c. When the airplane reaches a relatively low speed, the voltage available from the wheel-driven generators and the corresponding back E. M. F. from the reference motor will be so small that voltage differences sufficient to energize the polarized relays cannot materialize under any operating conditions. Hence during taxiing and parking of the airplane skid signals capable of releasing the brakes cannot occur and the airplane brakes will be completely under control of the pilot who operates the metering valve 22.

I claim as my invention:

1. In a brake control system for the brakes associated with a plurality of separately rotatable vehicle wheels, the combination comprising an individual voltage generator for each of said wheels adapted to supply a voltage corresponding substantially to the rotary speed of the associated wheel, a reference voltage circuit, means applying to said reference voltage circuit a voltage corresponding substantially to instantaneous ground speed of said vehicle hence to the individual generator voltages when the wheels respectively associated therewith are not slipping, dynamo-electric means electrically connected to said reference voltage circuit to store mechanical energy derived therefrom proportional to the prevailing voltage in said circuit and having a self-deenergizing rate when not energized by said circuit slightly greater than the maximum decelerating rate of the vehicle during application of said brakes, and individual release means for the brakes of each wheel electrically energizable for reducing the brake pressure on such wheel, the release means for each such wheel brake having a polarity-sensitive voltage responsive control device connected to the corresponding wheel generator and to said reference voltage circuit to be energized proportionally to the voltage difference therebetween of a single polarity, each such release means being operable only in response to such a voltage difference corresponding to an appreciable reduction of associated wheel generator voltage below reference voltage circuit voltage, representing the condition of slipping of the corresponding wheel by excessive brake force application.

2. The brake control system defined in claim 1, wherein the means applying voltage to the reference voltage circuit comprise circuit connections to said reference voltage circuit from each of the voltage generators, including unidirectionally conductive devices interposed in each of said circuit connections to permit current flow only in the direction from each such generator to such reference voltage circuit.

3. The combination defined in claim 1, wherein the brake release means control devices comprise polarized relays and means controlled thereby for reducing brake pressure applied to the respective wheels, said polarized relays each having an electroresponsive control winding connected between the corresponding voltage generator and the reference voltage circuit.

4. An airplane landing wheel brake control system associated with a plurality of separately rotatable airplane landing wheel units, comprising, in combination with the landing wheel units, separate brakes for such units and means under control of the airplane pilot for applying said brakes simultaneously; individual voltage generators driven by the respective wheels for providing a wheel-speed voltage for each wheel which increases and decreases with increase and decrease of wheel rotational speed, a dynamo-electric device having energization terminals, circuit means including unidirectionally conductive devices applying the voltages of the respective generators to the terminals of said dynamo-electric device for energization thereof to store energy in mechanical form in such device, individual brake release means for each of said wheel units, each such brake release means including a control element electrically energizable for operating said means to reduce the pilot-controlled brake pressure on the associated wheel unit independently of the other wheel units, and voltage-comparison circuit means connecting each of said brake release means control elements between their respectively associated wheel generators and said dynamo-electric device for applying to said control elements differences in voltage of their associated wheel unit generators and the voltage existing at the energization terminals of said dynamo-electric device, said brake release means control elements being operable in response to such difference voltages for effecting brake pressure reductions solely in response to voltage differences representing decrease of associated generator voltage below dynamo-electric device terminal voltage, said dynamo-electric device having a rate of self-deenergization when unenergized somewhat higher than the maximum rate of decay of generator means voltage during airplane landing run deceleration.

5. The airplane landing wheel brake control system defined in claim 4, wherein the brake release means control elements comprise polarized relays having control coils energizable to effect reversal of such relays solely by application of voltage differences of a predetermined polarity to such control coils.

6. The airplane landing wheel brake control system defined in claim 4, further comprising a source of voltage independent of the wheel-driven voltage generators, such source voltage being equal to a value somewhat less than maximum generator voltage during the landing run, and means operable at will preliminary to landing of the airplane for applying the voltage of said independent source to the dynamo-electric device terminals, thereby storing energy in such dynamo-electric device and effecting control energization of all the brake release means preliminary to initial ground contact of the airplane landing wheels.

7. The airplane landing wheel brake control system defined in claim 6, and means operable by deenergization of a brake release means control element automatically to interrupt application of the independent source voltage to the dynamo-electric device terminals.

8. The airplane landing wheel brake control system defined in claim 7, wherein the voltage interrupting means comprises a plurality of relays individually associated with the respective wheel unit brake release means and having switching contacts closed by energization of the associated brake release means control elements, said switching contacts being connected in a circuit comprising a holding circuit for effecting application of the independent source voltage to the dynamo-electric device terminals, whereby deenergization of any brake release means control element by increase of corresponding generator voltage accompanying acceleration of the associated wheel unit to full running speed produces interruption of said voltage application.

9. The airplane landing wheel brake control system defined in claim 8, wherein the means for applying the independent source voltage to the dynamo-electric device terminals comprise a relay having normally open contacts connected in circuit with said terminals and having a control winding connected in the said holding circuit for flow of energizing current in said control winding through said holding circuit, and a switch having contacts connected in said holding circuit, said switch being arranged for closure of its contacts automatically in flight of the airplane to complete said holding circuit, and for opening of its contacts automatically to interrupt said holding circuit by landing of the airplane.

10. In combination with a vehicle having a plurality of wheels, separate brakes for the respective wheels, and means for applying said brakes; automatic brake control apparatus comprising separate brake release means operatively associated with the respective wheel brakes and actuatable for reducing the brake pressure applied to such wheels, electrically energizable brake release control means individually arranged for separately actuating the respective brake release means by and during energization of any such control means, and electrical means automatically controlling energization of said brake release control means to prevent skidding of said wheels during brake applications, said electrical means including a plurality of direct-voltage generating means separately driven by rotation of the respective wheels to provide output direct voltages which increase and decrease with increase and decrease of rotational speed of the respective wheels, reference voltage circuit means, an individual circuit connection between each of said generating means and said circuit means, unidirectionally conductive devices interposed with like polarity in the respective circuit connections to permit current flow therein only in the direction of application of generating means output direct voltages to said reference voltage circuit means, a direct-current speed-reference motor connected to said reference voltage circuit means to be energized thereby for rotation and alternatively to apply its counterelectromotive force to said reference voltage circuit means, and means connecting said brake release control means between their respectively associated generating means and said reference voltage circuit means to be subjected to the respective voltage differences therebetween, said control means being polarity sensitive to respond only to such a voltage difference wherein the associated generating means output voltage is less than the reference voltage circuit means voltage, representing the condition of slipping of the associated vehicle wheel, thereby to reduce the brake pressure applied to such wheel and permit its acceleration toward full running speed.

11. In combination with a vehicle having a plurality of wheels, separate brakes for the respective wheels, and means for applying said brakes; automatic brake control apparatus comprising separate brake release means operatively associated with the respective wheel brakes and actuatable for reducing the brake pressure applied to such wheels, brake release control means individually arranged for separately actuating the respective brake release means by and during energization of any such control means, and automatic means controlling energization of said control means to prevent skidding of said wheels during brake applications, said automatic means including a plurality of generating devices separately driven by rotation of the respective wheels, each to convert energy of rotation into energy in a second form the level of which generated by said generating devices increases and decreases with increase and decrease of rotational speed of the respective wheels, energy storage means connected to all of said generating devices normally to store energy therefrom at a level increasing proportionally to increase of rotational speed of all the wheels, and means comparing the energy level instantaneously stored by said storage means with the instantaneous energy level of each generating device, including energizing connections to the respective control means, said latter means automatically operating the control means for releasing the brakes of any wheel whose instantaneous speed lies materially below a value corresponding to the existing level of energy stored by said energy storage means, representing the condition of slipping of such wheel, said storage means having a rate of decay of stored energy which is low relative to the rate of energy level reduction rate of the generating devices accompanying slipping of a wheel due to excessive braking thereof.

12. In combination with a vehicle having a plurality of wheels, separate brakes for the respective wheels, and means for applying said brakes; automatic brake control apparatus comprising separate brake release means operatively associated with the respective wheel brakes and actuatable for reducing the brake pressure applied to such wheels, electrically energizable brake release control means individually arranged for separately actuating the respective brake release means by and during energization of any such control means, and electrical means automatically controlling energization of said brake release control means to prevent skidding of said wheels during brake applications, said electrical means including a plurality of voltage generators separately driven by rotation of the respective wheels to provide output voltages which increase and decrease with increase and decrease of rotational speed of the respective wheels, reference voltage circuit means, an individual circuit connection between each of said generating means and said circuit means, unidirectionally conductive devices interposed with like polarity in the respective circuit connections to permit current flow therein only in the direction of application of generating means output voltages to said reference voltage circuit means, electro-dynamic means connected to said reference voltage circuit means to be energized thereby for storing kinetic energy at a level increasing with rotational speed of all the wheels and alternatively to apply its counterelectromotive force to said reference voltage circuit means, and means connecting said brake release control means between their respectively associated generator and said reference voltage circuit means to be subjected to the respective voltage differences therebetween, said control means being polarity sensitive to respond only to such a voltage difference wherein the associated generator output voltage is less than the reference voltage circuit means voltage, representing the condition of slipping of the associated vehicle wheel, thereby to reduce the brake pressure applied to such wheel and permit its acceleration toward full running speed.

13. In combination with a vehicle having a plurality of wheels, separate brakes for the respective wheels, and means for applying said brakes; automatic brake control apparatus comprising separate brake release means operatively associated with the respective wheel brakes and actuatable for reducing the brake pressure applied to such wheels, brake release control means individually arranged for separately actuating the respective brake release means by and during energization of any such control means, and automatic means controlling energization of said control means to prevent skidding of said wheels during brake applications, said automatic means including a plurality of generating devices separately driven by rotation of the respective wheels, each to convert energy of rotation into energy in a second form the level of which generated by said generating devices increases and decreases with increase and decrease of rotational speed of the respective wheels, energy storage means, means controlled by vehicle speed to store energy in said second form normally at a level increasing proportionally to increase of ground speed hence increase of rotational speed of the wheels, and means comparing the energy level instantaneously stored by said storage means with the instantaneous energy level of each generating device, including energizing connections to the respective control means, said latter means automatically operating the control means for releasing the brakes of any wheel whose instantaneous speed lies materially below a value corresponding to the existing level of energy stored by said energy storage means, representing the condition of slipping of such wheel, said storage means having a rate of decay of stored energy which is low relative to the rate of energy level reduction rate of the generating devices accompanying slipping of a wheel due to excessive braking thereof.

14. A vehicle anti-skid brake system comprising in combination, a plurality of vehicle wheels, individual brakes operatively associated with such wheels, brake-actuating means operable to apply said brakes to said wheels substantially simultaneously, individual brake-release means operatively connected to the respective wheel brakes and separately operable to interrupt braking of such wheels individually without interrupting braking of the other wheels, and skid-preventing control means automatically operating said brake-release means in response to skidding of any or all such wheels to interrupt braking thereof for a time allowing such wheels to return substantially to normal running speed, said skid-preventing control means comprising a plurality of voltage-generating means respectively connected to a plurality of said wheels to be driven thereby for generating voltage which increases and decreases with wheel speed, energy storage means connected to be energized by all of said voltage generating means for storing energy therein at a level which increases and decreases with such voltage, said energy storage means losing its stored energy at a rate, when not energized by said voltage generating means, which is slow in relation to the rate of decrease of voltage of said voltage generating means accompanying skidding of the respective wheels driving the same, said energy storage means itself producing a voltage which increases and decreases with the level of energy stored therein, and a plurality of polarity-selective voltage-responsive devices respectively connected to said individual voltage generating means and to said energy storage means for responding to the respective voltage differences therebetween, said voltage-responsive devices being operatively connected to the respective brake-release means for operating the same selectively in response to and during said energy storage means voltage exceeding any such generating means voltage.

15. A vehicle anti-skid brake system comprising in combination, a plurality of vehicle wheels, individual brakes operatively associated with such wheels, brake-actuating means operable to apply said brakes to said wheels substantially simultaneously, individual brake-release means operatively connected to the respective wheel brakes and separately operable to interrupt braking of such wheels individually without interrupting braking of the other wheels, and skid-preventing control means automatically operating said brake-release means in response to skidding of any or all such wheels to interrupt braking thereof for a time allowing such wheels to return substantially to normal running speed, said skid-preventing control means comprising a plurality of pressure-generating means respectively connected to a plurality of said wheels to be driven thereby for generating pressure which increases and decreases with wheel speed, energy storage means connected to be energized by all of said pressure generating means for storing energy therein at a level which increases and decreases with such pressure, said energy storage means losing its stored energy at a rate, when not energized by said pressure generating means, which is slow in relation to the rate of decrease of pressure of said pressure generating means accompanying skidding of the respective wheels driving the same, said energy storage means itself producing a pressure which increases and decreases with the level of energy stored therein, and a plurality of pressure-responsive devices respectively connected to said individual pressure generating means and to said enery storage means for responding to the respective pressure differences therebetween, said pressure-responsive devices being operatively connected to the respective brake-release means for operating the same selectively in response to and during said energy storage means pressure exceeding any such generating means pressure.

16. The anti-skid brake system defined in claim 14, wherein the energy storage means comprises a pressure-dynamic device storing kinetic energy in response to applied pressure, the said pressure produced by said energy storage means itself comprising a counteracting pressure developed in said pressure-dynamic device in opposition to such applied pressure.

References Cited in the file of this patent

UNITED STATES PATENTS

| | | |
|---|---|---|
| 2,025,889 | Pardee | Dec. 31, 1935 |
| 2,096,480 | Cotter | Oct. 19, 1937 |
| 2,663,521 | Yarber | Dec. 22, 1953 |